(No Model.) 3 Sheets—Sheet 1.

S. T. WELLMAN & G. W. GOETZ.
APPARATUS FOR THE MANUFACTURE OF GAS.

No. 376,835. Patented Jan. 24, 1888.

WITNESSES
F. E. Gaither.
M. S. Murphy.

INVENTORS
Samuel T. Wellman.
George W. Goetz.
Samuel E. Wolcott Attorney (No Model.) 3 Sheets—Sheet 2.

S. T. WELLMAN & G. W. GOETZ.
APPARATUS FOR THE MANUFACTURE OF GAS.

No. 376,835. Patented Jan. 24, 1888.

WITNESSES
INVENTORS (No Model.) 3 Sheets—Sheet 3.

S. T. WELLMAN & G. W. GOETZ.
APPARATUS FOR THE MANUFACTURE OF GAS.

No. 376,835. Patented Jan. 24, 1888.

WITNESSES
INVENTORS
Attorney

UNITED STATES PATENT OFFICE.

SAMUEL T. WELLMAN AND GEORGE W. GOETZ, OF CLEVELAND, OHIO, ASSIGNORS TO THE FUEL GAS AND ELECTRIC ENGINEERING COMPANY, (LIMITED,) OF PITTSBURG, PENNSYLVANIA.

APPARATUS FOR THE MANUFACTURE OF GAS.

SPECIFICATION forming part of Letters Patent No. 376,835, dated January 24, 1888.

Application filed February 24, 1887. Serial No. 228,672. (No model.)

*To all whom it may concern:*

Be it known that we, SAMUEL T. WELLMAN and GEORGE W. GOETZ, residing at Cleveland, in the county of Cuyahoga and State of Ohio, citizens of the United States, have invented or discovered certain new and useful Improvements in Apparatus for the Manufacture of Gas, of which improvements the following is a specification.

Figure 1:
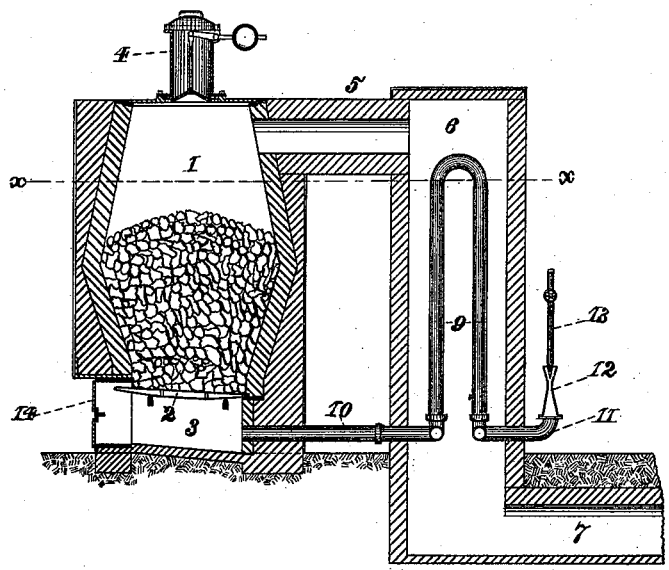
Figure 2:
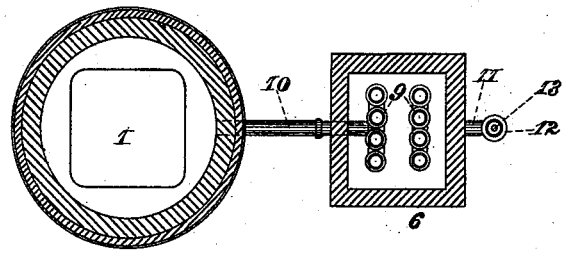
Figure 4:
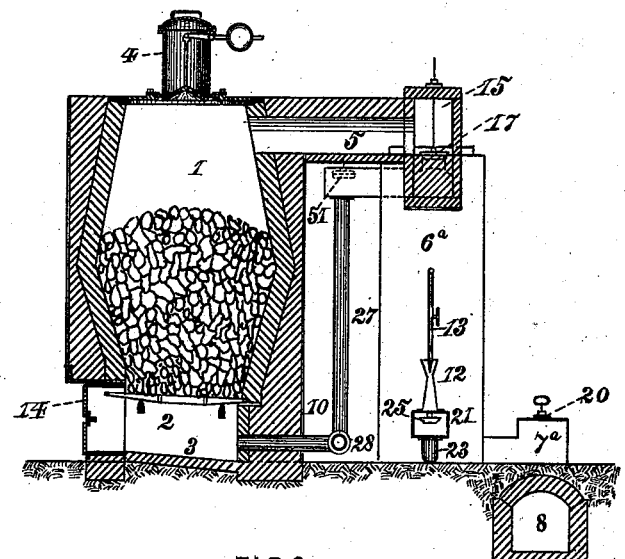
Figure 3:
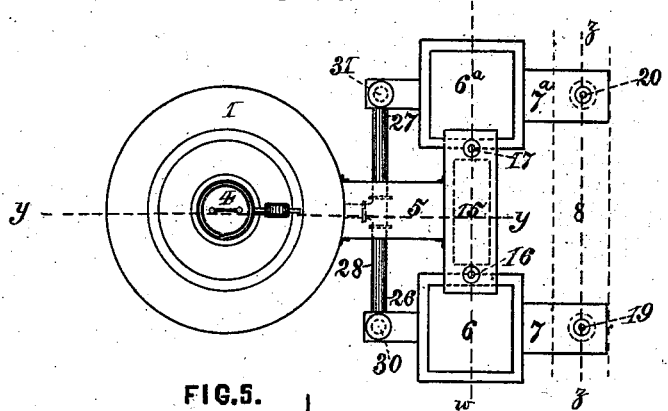
Figure 5:
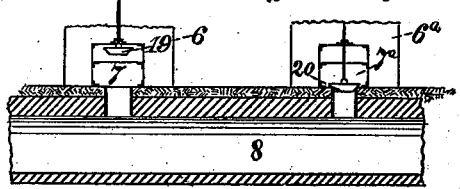
Figure 6:
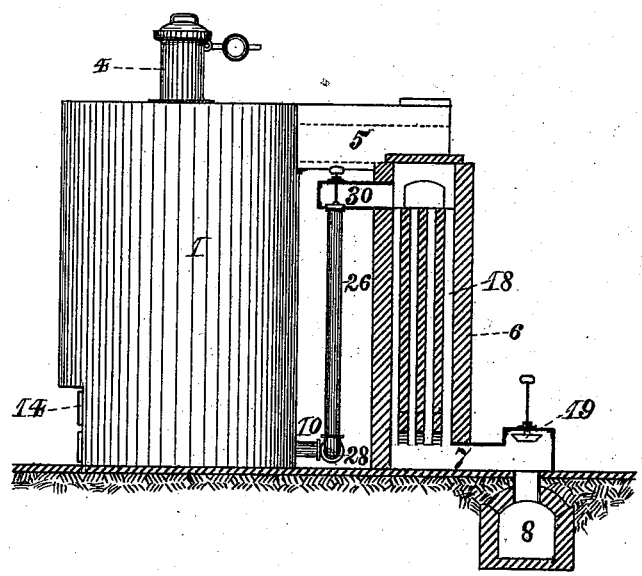
Figure 7:
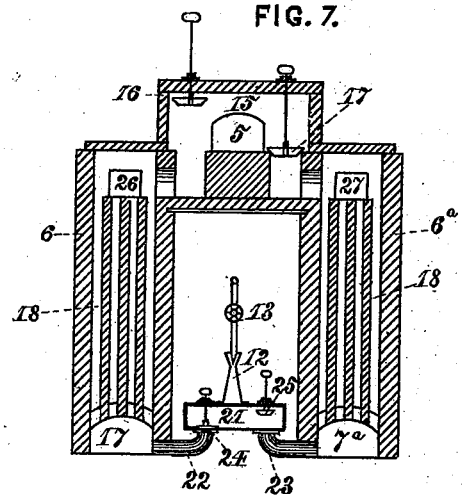
Figure 8:
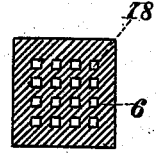

In the accompanying drawings, which make part of this specification, Figure 1 is a sectional elevation of a gas-producer for carrying out our improved method. Fig. 2 is a sectional view on the line $x$ $x$, Fig. 1. Fig. 3 is a plan view of a modified form of construction of the plant. Fig. 4 is a vertical section on the line $y$ $y$, Fig. 3. Fig. 5 is a vertical section of the conduit on the line $z$ $z$, Fig. 3. Fig. 6 is a view in side elevation of the stack, one of the superheaters being shown in section. Fig. 7 is a vertical sectional view on the line $w$ $w$, Fig. 3. Fig. 8 is a transverse sectional view of one of the superheaters.

Producer gas is at present manufactured by charging a suitable shaft with a sufficient quantity of coal, which is ignited and burns principally at or near the supporting-grates, producing, among other gases, a large volume of carbonic-acid gas, which, passing up through the superincumbent incandescent coal, is reduced to carbonic oxide. The resulting gases which escape from the producer contain approximately twenty to twenty-six per cent. of carbonic oxide, two to four per cent. of hydrogen, one to three per cent. of hydrocarbons, and sixty-seven to seventy-seven per cent. of nitrogen and other non-combustible gases.

It will be readily understood that while producer gas can be cheaply and economically manufactured it is commercially impracticable to utilize such gas for distribution through towns or cities for heating purposes on account of the large percentage of useless gases which must be carried in the pipes.

Inasmuch as in the above-mentioned method more heat is generated in the producer or stack than is required for the maintenance of incandescent coal necessary for the reduction of carbonic-acid gas to carbonic oxide, it has been customary, in order to utilize this heat, to pass steam through the incandescent coal, thereby forming carbonic oxide and hydrogen, and also reducing the temperature of the coal. As soon as the coal is cooled to such an extent as to be no longer effective for decomposing the steam the latter is cut off and air is forced through the coal until it is again highly heated. These alternations of the air and steam result not only in the production of a poorer quality of gas, but also in a comparatively slow production or formation of gases.

The object of the invention herein is to increase the volume of combustible gases generated in a converter for a given amount of coal without correspondingly or even materially increasing the volume of non-combustible gases, and without materially increasing the cost of production; and it is a further object of said invention to utilize the now wasted heat of the gases for facilitating the gas-generating operations.

To these ends the invention consists, in general terms, in the method and apparatus as more fully hereinafter described and claimed.

In the practice of our invention in its simplest form, the stack 1, which is of the form or construction usual in gas-producers, and is provided with the customary grate-bars, 2, ash-pit, 3, charging-chute, 4, and exit-flue, 5, is charged with a suitable amount of coal, a fire having first been started on the grates. As the combustion proceeds, large volumes of gases are formed, composed principally of carbonic-acid gas, which, as it passes up through the superincumbent mass of incandescent coal, soon loses a part of its oxygen and is converted into carbonic oxide. This carbonic oxide, together with other gases produced in the stack, pass in a highly-heated condition out through the flue 5, down through the vertical flue 6, and thence by the horizontal passage 7 to the conduit 8. In order to utilize the heat of these gases, a series of U-shaped tubes, 9, is arranged in the vertical flue 6, said tubes being connected at one end to a pipe, 10, leading into the ash-pit 3 under the stack. The opposite ends of these tubes 9 are connected to a pipe, 11, leading outside of the flue 6, and having a bell-mouthed nozzle, 12, in its outer end. In this bell-mouthed nozzle is arranged the end of a steam-pipe, 13, leading from any suitable source of steam-supply. After the charge in the stack has become incandescent the doors 14 in the ash-pit 3 are closed, and the valve in the steam-pipe 13 is opened, thereby allowing steam to rush into the pipe 11, drawing with it air through the bell-mouthed nozzle 12. The current of mingled steam and air passes from the pipe 11 into and through the tubes 9, which are highly heated by the gases from the stack and from the tubes 9, into the ash-pit, and thence through the incandescent mass of coal. As the steam passes through the incandescent material, it is decomposed and forms, in connection with the other gases, carbonic oxide and hydrogen. The volume of gas thus produced is increased in proportion to the amount of steam used, and as nearly the entire increased production is combustible the percentage of nitrogen in the whole amount produced is correspondingly decreased. As the steam and air are, in the usual practice above referred to, admitted into the producer at normal temperatures, there must of necessity be a considerable sacrifice of heat in raising the air and steam to the proper temperatures for the production of gas; but by highly superheating the air and steam, by means of the tubes which are heated by the escaping gases, a more rapid formation of gas is obtained, and a reduced degree of cooling action is exerted by the steam upon the incandescent coal; hence a larger quantity of steam can be used, thereby increasing the volume of combustible gases. By properly proportioning the amount of air and steam admitted the production of the two gases—i. e., that obtained from the passage of air and that by the passage of steam through the incandescent coal—can be made continuous, thereby avoiding the alternations above referred to and the consequent cooling and heating of the coal.

When it is desired to produce large volumes of gas, and it is therefore necessary to use correspondingly large quantities of air and steam, the apparatus shown in Figs. 1 and 2 will not afford sufficient facilities for highly heating the air and steam. Therefore, in lieu of the single "superheater," as we term the vertical flue 6, with the tubes contained therein, two flues or superheaters, 6 and 6ª, are provided, as shown in Figs. 3 to 8, inclusive, said superheaters being connected to the exit-flue 5 by the branch flue 15, provided on opposite sides of the flue 5 with regulating-valves 16 and 17, whereby either of the superheaters may be cut off from communication with the flue 5 and the producer. These flues or superheaters 6 and 6ª are built of fire-brick or other refractory material, and are provided with a number of comparatively small passages, 18, extending the entire length thereof, the walls of said passages forming a large heating-surface.

In lieu of the continuous passages 18, the flues or superheaters may be filled with a checker-work of brick, or any other suitable construction, whereby a large superficial area in the superheaters may be provided. These flues or superheaters 6 and 6ª communicate at their lower ends with the main gas-conduit 8 by passages 7 and 7ª, as clearly shown in Figs. 3, 4, 5, and 6, said passages being provided with valves 19 and 20 for governing admission of the gases into the conduit. Between the superheaters is arranged a chest or box, 21, having pipes 22 and 23 at their ends, said pipes leading, respectively, into the lower ends of the superheaters, as shown in Figs. 3 and 7. On the box or chest 21 is placed the bell-mouthed nozzle 12, in which is arranged the steam-pipe 13, as above described. In order that the steam and air forced into the box 21 may be directed into either of the superheaters, as desired, valves 24 and 25 are provided for opening and closing the pipes 22 and 23. Into the upper ends of the superheaters are inserted pipes 26 and 27, connecting at their lower ends with the pipe 28, which in turn communicates by the pipe 10 with the ash-pit of the producer or stack. The pipes 26 and 27 are provided with suitable valves, 30 and 31, for governing the flow of superheated air and steam from the upper ends of the superheaters.

While the valves are adjusted as shown in Figs. 3 to 8, the operation of the plant is as follows: The steam and air pass from the chest 21, through the pipe 23, into the superheater 6ª, and during their passage through the passages 18 of said superheater are highly heated. From the upper end of the superheater 6ª the now highly-heated steam and air pass, by the pipes 27, 28, and 10, into the ash-pit 3, thence up through the stack 1, where the steam and air, coming into contact with the incandescent material and the gases therefrom, are converted, as above stated. The gases produced in the stack escape by the flue 5 into the transverse flue 15, whence they pass into the superheater 6 down its passages 18, highly heating the walls thereof, and thence by the flue 7 into the conduit 8. As soon as the walls of the passages 18 in the superheater 6ª have been cooled down to such a degree as to be no longer effective in superheating the steam and air, the valves 25, 31, 16, and 19 are closed and the corresponding valves 24, 30, 17, and 20 are opened, thereby reversing the operation of the plant, the steam and air being directed through the superheater 6 to the stack, and the gases from the stack through the superheater 6ª and flue 7ª into the conduit 8.

We claim herein as our invention—

In a plant for the production of gas, the combination of a stack or producer, flues governed by valves and leading from the stack to a distributing-conduit, each of said flues being provided with a series of heating-passages, pipes governed by regulating-valves and leading from said heating-passages to the ash-pit of the stack, a box or chest having valved connections with the flues, and an injector for forcing mingled steam and air into said box or chest, substantially as set forth.

In testimony whereof we have hereunto set our hands.

SAMUEL T. WELLMAN.
GEORGE W. GOETZ.

Witnesses:
THOS. H. BROOKS,
W. H. SHEPARD.